Nov. 14, 1944. W. H. LEWIS 2,362,490
CEMENT TROWELLING MACHINE
Filed Aug. 10, 1940 2 Sheets-Sheet 1
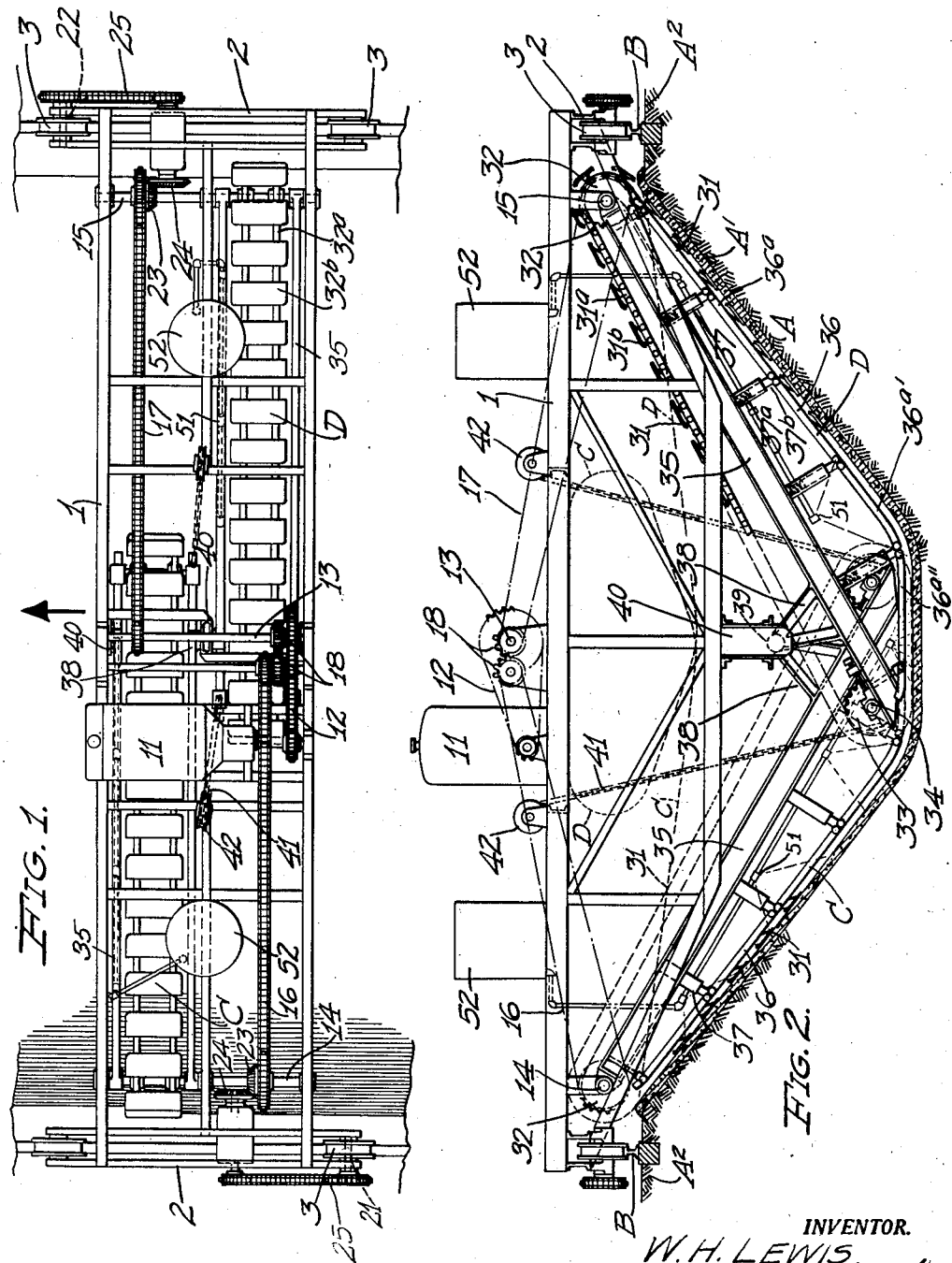
INVENTOR.
W. H. LEWIS
BY William E. Hall
ATTORNEY Nov. 14, 1944.                 W. H. LEWIS                    2,362,490
                         CEMENT TROWELLING MACHINE
                         Filed Aug. 10, 1940        2 Sheets-Sheet 2

INVENTOR.
W. H. LEWIS.
BY William E. Hall
ATTORNEY

Patented Nov. 14, 1944

2,362,490

UNITED STATES PATENT OFFICE 2,362,490

CEMENT TROWELING MACHINE

William Hurst Lewis, Los Angeles, Calif.

Application August 10, 1940, Serial No. 352,163

15 Claims. (Cl. 61—63)

My present invention relates to a cement or similar troweling machine particularly adapted for walls of canals, or the like.

Heretofore it was customary to spread conconcrete, cement, or other plastic materials mechanically, and then to trowel the surface by hand. The surfaces troweled in the manner often were very uneven and required considerable time to prepare.

One of the principal objects of this invention is to provide a machine whereby a surface may be troweled mechanically, evenly, and quickly.

An important object also of this invention is to provide a machine of this class for troweling simultaneously all the lining walls of a ditch or canal, and for performing such operation continuously by advancing the troweling machine along the direction of the ditch or canal.

Another important object of this invention is to provide a troweling machine for ditches or canals having inclined sides or walls and in which the inclined sides or walls merge with the bottom in gradually rounded corners.

Another important object also of this invention is to provide a machine of this class in which the concrete, cement, or other plastic material, is troweled from the bottom upwardly on the inclined walls, and in which such upward troweling on the inclined walls is performed simultaneously on the opposite side walls.

A further important object of this invention is to provide a troweling machine for ditches or canals of various sizes and shapes, and a machine which may be readily adjusted to accommodate the machine to ditches or canals of the required or desired shapes.

A still further object of this invention is to provide a machine of this class in which the troweling elements for the sides of the ditch or canal may be readily collapsed so that the machine may be conveniently transported.

A still further object of this invention is to provide a machine of this class whereby reasonable bends or curves in the ditch or canal may be mechanically troweled.

An important object also of this invention is to provide such a machine having novel and effective troweling elements and novel means of carrying and operating the same.

An object of this invention also is the provision of a machine of this class which is relatively simple and economic of construction, proportionate to its functions, which may be readily operated and adjusted, and which will not readily deteriorate or get out of order.

With these and other objects in view, as will appear hereinafter, I have devised a troweling machine of this class having certain novel features of construction, as will be hereinafter described in detail and particularly set forth in the appended claims, reference being had to the accompanying drawings, and to the characters of reference thereon, which form a part of this application, in which:

Fig. 1 is a plan view of my troweling machine in a preferred form;

Fig. 2 is a front elevational view thereof, shown in position in a canal, for troweling freshly laid cement of the lining walls thereof, and showing by dotted lines the troweling means in raised positions to facilitate the transportation of the machine, either in the canal or for the purpose of mounting the same on a transporting vehicle;

Figure 7:
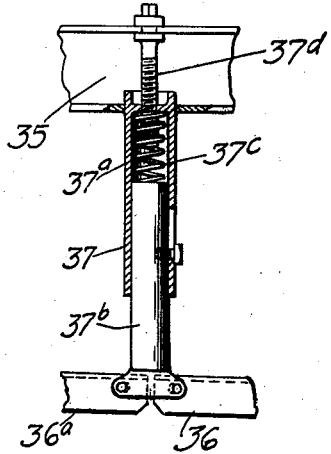
Figure 3:
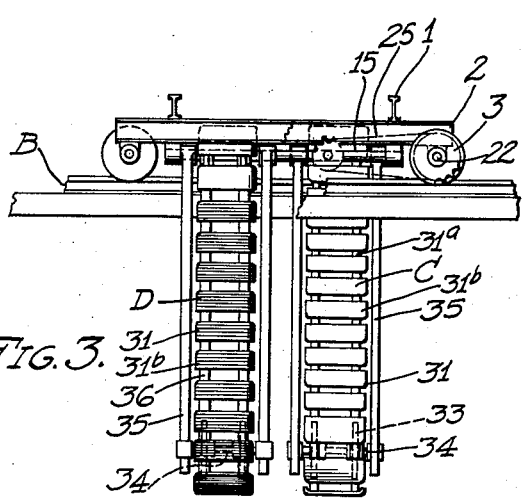
Fig. 3 is a side elevational view thereof.

The ditches or canals employed in irrigation and for similar purposes are preferably wide ditches or canals with gradually inclined side walls and a flat bottom.

The canal A, shown in the drawings, is of this character, the inclined side walls thereof being designated $A^1$, and the shoulders at the opposite sides and above the inclined side walls being designated $A^2$. On these shoulders I have provided rails, forming a track B, for supporting and guiding my troweling machine.

The frame 1, of the machine shown, is constructed similar to a bridge truss and spans the whole canal. This frame or truss is carried on narrow trucks, consisting of sub-frames 2 having flanged wheels 3 at their opposite ends. These wheels ride upon the rails of the track B, and the opposite ends of the frame or truss 1 rest upon the sub-frames 2. If desired, the truss 1 may be raised or lowered by any suitable means (not shown) with respect to the trucks or supporting wheels 3. The main portion of the truss 1 extends preferably below the wheels 3 into the canal A.

On the frame 1 is a power drive unit 11 which is connected by suitable direct and reverse gearing or drive 12 to a central drive shaft 13. Near the ends of the frame 1 are countershafts 14 and 15 which are shown as driven by sprocket chains 16 and 17, respectively, from the drive shaft 13. The countershafts 14 and 15 are caused to rotate in opposite directions, the latter by a direct drive, and the former by a suitable reverse gearing, designated 18 in Fig. 1.

Stub shafts 21 and 22 are connected to the countershafts 14 and 15, respectively, by bevelled gears 23 and 24. These stub shafts are operatively connected by sprocket chains 25 to the axle upon which one of the wheels of each truck is mounted, as shown best in Fig. 1.

I have provided two troweling units C and D on my machine, one extending to the opposite sides from the central portion of the machine, and one positioned at the front and the other at the rear side of the machine, that is, one positioned forwardly of the other.

Each troweling unit comprises a trowel carrying conveyor 31, consisting of spaced apart continuous link belts 31ᵃ, troweling elements 31ᵇ, and spring arms 31ᶜ for securing the troweling elements to the link belts. One end of the loops of the link belts are mounted on spaced sprockets 32, and the other ends on spaced sprockets 33. The sprockets 32 are carried by the respective countershafts, those of the conveyor C being mounted on the countershaft 14, and those of the conveyor D being mounted on the countershaft 15. The sprockets 33 are mounted on the shaft 34, provided at the free end of a tiltable frame 35 which is pivoted at its opposite end on the countershaft 14 or 15, the frame 35 of the conveyor C being pivoted on the countershaft 14 while the frame 35 of the conveyor D is mounted on the countershaft 15.

Figure 6:
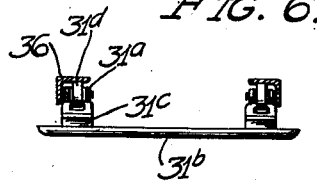
Fig. 6 is a transverse sectional view thereof, taken through 6—6 of Fig. 4; and, Fig. 7 is an enlarged fragmentary sectional view showing the mounting of the rail sections, by extensible arms, or the conveyor frame.
Figure 5:
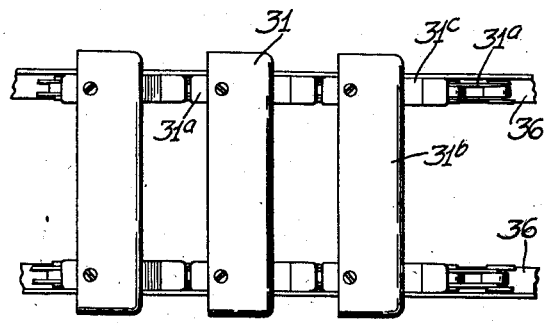
Fig. 5 is a face view of the troweling means.

The lower portion of the troweling conveyor is guided by a track 36 which is provided at the lower side of the frame 35. The supporting means for the track comprises a plurality of laterally spaced longitudinally extensible arms 37, which may be of any suitable construction. They are here shown as consisting of cylindrical tubes 37ᵃ, supported on the frame 35, and/or supporting plungers 37ᵇ telescoping into the cylindrical tubes 37ᵃ. The supporting plungers are forced to their outward or extended positions by springs 37ᶜ. The whole arm is here shown as adjusted longitudinally, by adjusting screws 37ᵈ for fixing the general positions of the rail sections 36ᵃ, as will be described. The tracks, one for each of the link belts 31ᵃ, are composed of said rail sections 36ᵃ which are carried by the ends of the supporting tubes 37ᵇ and are pivotally connected at their opposite ends to adjacently positioned supporting tubes. These track sections of the opposed tracks, consist of angle irons. The sections of the opposed tracks are positioned with one flange directed downwardly and the other flanges directed toward each other. The link belts 31ᵃ are provided with rollers 31ᵈ which are adapted to ride against the lower sides of the upper flanges of the tracks; the lateral movement of each troweling conveyor is limited by the vertical flanges of the tracks, as shown best in Fig. 6.

It will be noted that if the troweling elements 31ᵇ encounter obstructions, the same are permitted to raise by reason of the springs 31ᶜ, and further by the springs 37ᶜ.

The contour of the sides and bottom of the canal is formed by the troweling conveyors. It will be noted that one inclined side wall and the adjacent portion of the bottom is finished by one troweling conveyor, while the other troweling conveyor is arranged to finish the other inclined side wall and the portion of the bottom adjacent thereto. The cross-section or shape of the canal is determined by the shape of the track sections 36ᵃ which may be adjusted to the various positions by the adjustable or telescoping arms 37. The track sections 36ᵃ upon or against which the portion of the troweling conveyor rides for forming or troweling the inclined side walls of the canal, are essentially straight, while the track sections, designated 36ᵃ' and 36ᵃ'', which form or trowel the corner portions of the canal between the bottom and the inclined side walls, or curved at their adjacent ends and merge with each other in a substantially continuous curve, as shown in Fig. 2. The track sections 36ᵃ''', which are located at the lower ends of the tracks and at the portions of the tracks which are first mounted by the troweling conveyor, are curved upwardly to facilitate the mounting of the troweling conveyor upon or against the tracks, as also shown in Fig. 2.

Near the free ends of the pivoted frames 35 are upwardly extending brackets 38 which are provided at their upper ends with guide shoes 39 which may slide vertically between guide plates 40 depending from the median portion of the frame or truss 1. These shoes and guides permit the troweling conveyors to be raised freely about and also above their pivotal axes. These shoes and guides are also adapted to hold the frames 35 against forward and backward distortion when the machine moves along on the supporting track B.

The lower positions of the free ends of the troweling conveyors may be determined, limited, or adjusted by supension members 41, which may be in the form of chains and which may be wound on separate windlasses 42.

Figure 4:
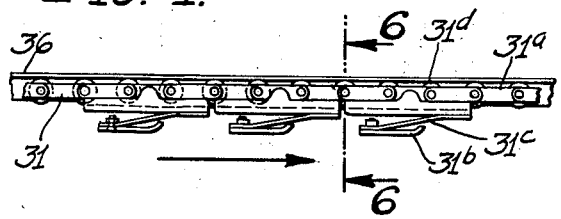
Fig. 4 is a side view of a fragmentary portion of the troweling means at one side of the machine.

The troweling elements 31ᵇ are preferably long, narrow, steel plates which are turned inwardly or upwardly at their forward or leading edges, as shown best in Fig. 4. The leaf spring arms 31ᶜ are secured near the opposite ends of the inner sides and rear edges of these plates 31ᵇ, and extend beyond the forward ends of the troweling elements or plates. These arms are secured at their forward ends to the link belts, as shown best in Fig. 4.

In order to facilitate the finishing operation of the troweling means, I have provided a plurality of spray nozzles 51 at intervals from the lower to the upper positions of the finishing portions of the conveyors. At each side of the frame is provided a water storage tank 52, and each of these tanks supplies water to the spray nozzles 51 at one side of the machine.

When transporting the machine from one place to another, the free ends of the troweling conveyors are raised to the dotted line positions by the chains 41 and windlasses 42. The machine may then be conveniently placed on a suitable flat vehicle. When so conveyed from place to place, the depending guides 40 are removed from the lower portion of the frame or truss 1.

Though I have shown and described a particular construction, combination, and arrangement of parts and portions of my troweling machine, I do not wish to be limited to the same, but desire to include in the scope of my invention the construction, combination, and arrangement substantially as set forth in the appended claims.

I claim:

1. A troweling machine of the class described, comprising a carriage, a pair of continuous belt conveyors extending from the ends of the carriage downwardly towards the middle portion thereof, and a plurality of troweling members carried by the conveyors, one of the conveyors being positioned forwardly of the other, and the inner ends of the same overlapping each other.

2. In a troweling machine of the class described, a frame, a plurality of arms extending adjustably therefrom, a track carried by said arms, said track consisting of track sections, the opposite ends of each section being pivotally mounted on adjacent arms, all of said sections forming an extended track with respect to each other, a continuous belt conveyor mounted on the frame and adapted to ride on the track, and a plurality of troweling elements carried by the conveyor.

3. In a troweling machine of the class described, a frame, a plurality of arms extending adjustably therefrom, a track carried by said arms, said track consisting of track sections, the opposite ends of each section being pivotally mounted on adjacent arms, all of said sections forming an extended track with respect to each other, a continuous link belt conveyor mounted on the frame and comprising pivotally connected links having rollers, said rollers being guided by and adapted to ride on the track, and a plurality of troweling elements carried by the conveyor.

4. In a troweling machine of the class described, a frame having downwardly converging frame elements, said elements having arms extending downwardly from the lower sides, separate tracks carried by the arms of each frame element, said tracks consisting of track sections, each section being pivotally mounted at its ends on adjacent arms, a separate belt conveyor mounted on each of the frame elements and adapted to ride on the tracks on each frame element, and troweling elements carried on each of the conveyors.

5. In a troweling machine of the class described, a frame having downwardly converging frame elements, said elements having arms extending downwardly from the lower sides, separate tracks carried by the arms of each frame element, said tracks consisting of track sections, each section being pivotally mounted at its ends on adjacent arms, a separate link belt conveyor mounted on each of the frame elements and consisting of pivotally connected links, said links having rollers, the rollers of each conveyor being guided by the tracks on each frame element, and troweling elements carried on each of the conveyors.

6. In a troweling machine of the class described, a frame having downwardly converging frame elements, said elements having arms extending downwardly from the lower sides, separate tracks carried by the arms of each frame element, said tracks consisting of track sections, each section being pivotally mounted at its ends on adjacent arms, a separate link belt conveyor mounted on each of the frame elements and consisting of pivotally connected links, said links having rollers, the rollers of each conveyor being guided by the tracks on each frame element, and means for adjusting the elevation of the inner ends of the frame elements and conveyors.

7. In a troweling machine of the class described, a frame, a pair of continuous belt conveyors extending convergingly downwardly from the opposite ends of the frame, one being positioned forwardly of the other and one overlapping the other, troweling members carried by each of the conveyors, said conveyors being mounted to move in opposite directions and upwardly at their lower sides from the lower portions of the conveyors.

8. A troweling machine for lining a ditch having a flat bottom and opposite inclined side walls extending upwardly from the bottom, a frame, a pair of continuous conveyors, the lower stretch of each of the conveyors being shaped to conform to one of the side walls of the ditch and the adjacent portion of the bottom thereof, the portions of the conveyors conforming to the bottom of the ditch overlapping each other, a plurality of troweling elements carried by each of the conveyors, the elements of each conveyor being carried in a path conforming to one of the side walls and the adjacent portion of the bottom of the ditch.

9. In a troweling machine of the class described, a frame, a plurality of arms extending adjustably therefrom, a flexible track carried by the ends of the arms, a continuous belt conveyor mounted on the frame and adapted to ride on the track, and a plurality of troweling elements carried by the conveyor.

10. A troweling machine of the class described, comprising a frame, a continuous conveyor mounted thereon, a plurality of troweling elements carried by the conveyor, said troweling elements comprising substantially flat plates turned upwardly at their forward edges, and leaf springs secured at their forward ends to the conveyor and inclined backwardly and outwardly therefrom, the rear ends of the springs being secured to the rear portions and inner sides of said plates.

11. A troweling machine of the class described, comprising a carriage, a pair of continuous belt conveyors, one pivotally mounted at one end at each side of the carriage, said conveyors extending from said pivoted sides downwardly towards the middle portion of the frame, a plurality of troweling members carried by the conveyors, one of the conveyors being positioned forwardly of the other, and the free ends of the same overlapping each other, and means for adjusting the elevation of the free ends of the conveyors with respect to the frame.

12. A troweling machine of the class described, comprising a frame, means at the opposite ends of the frame for supporting and guiding the same, a pair of continuous belt conveyors extending from the ends of the frame downwardly towards the middle portion thereof, the lower stretches of said conveyors movable upwardly and outwardly from said middle portion, and a plurality of immediately successive troweling members carried by the conveyors, said troweling members comprising substantially flat plates positioned at the outer side of and substantially parallel to the path of the conveyors.

13. In a troweling machine of the class described, a frame, a plurality of arms extending adjustably therefrom, a variable vertically undulatory track carried by the ends of the arms, a continuous belt conveyor mounted on the frame and adapted to ride on the track, and a plurality of immediately successive troweling elements carried by the conveyor.

14. A troweling apparatus, comprising a frame, a trowel operating means mounted thereon, and a troweling element carried by said means, said troweling elements comprising a substantially flat plate turned upwardly at its forward edge, said plate being resiliently connected at substantially its rear edge to the means adjacent the forward portion of said plate.

15. A troweling machine of the class described, comprising a frame, a continuous conveyor mounted thereon, a plurality of troweling elements carried by the conveyor, said troweling elements comprising substantially flat plates turned upwardly at their forward edges, said plates being resiliently connected at substantially their rear edges to the conveyor adjacent the forward portions of the respective plates.

WILLIAM HURST LEWIS.